Nov. 8, 1966  F. BRASCO ETAL  3,284,379
UREA-FORMALDEHYDE FOAM
Filed March 13, 1963
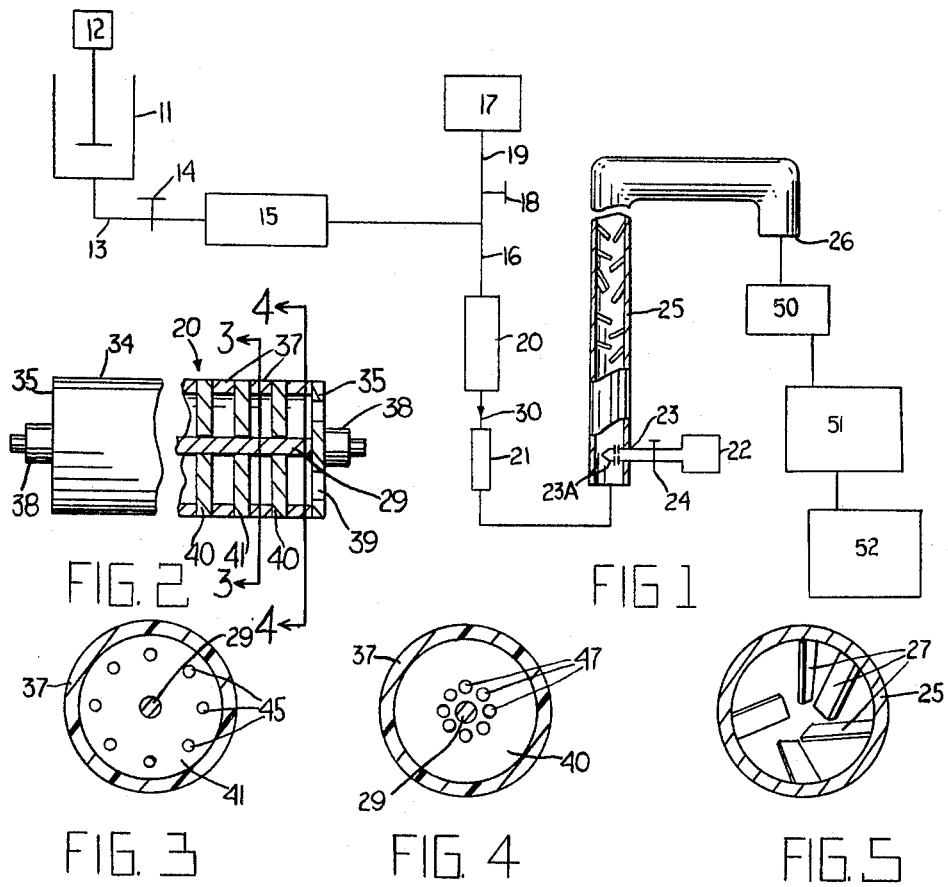
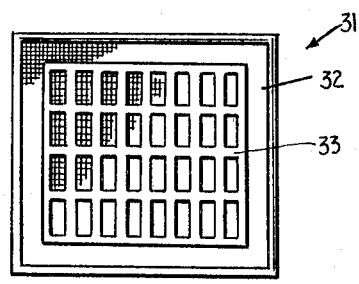
INVENTORS
Frederick Brasco,
Philip R. Temple
BY Ezekiel Wolf, Wolf & Greenfield

United States Patent Office 3,284,379
Patented Nov. 8, 1966

3,284,379
UREA-FORMALDEHYDE FOAM
Frederick Brasco, Weston and Philip R. Temple, West Medway, Mass., assignors, by mesne assignments, to Arthur D. Little Inc., Cambridge, Mass., a corporation of Massachusetts
Filed Mar. 13, 1963, Ser. No. 264,897
4 Claims. (Cl. 260—2.5)

This invention relates in general to plastic foam and more particularly to a method of efficiently treating aldehyde-condensation resin foams such as urea-formaldehyde resin foams to prevent cracking or disintegration of these materials on final drying. The method according to the invention is commercially advantageous since it maximizes rapid and efficient production of non-cracking foam.

Since the development of aldehyde-condensation foam such as urea-formaldehyde foam, cracking and in some cases disintegration of the foam upon final drying and curing has been a bothersome problem. Particularly in the case of urea-formaldehyde molded foam blocks used as bases for floral displays, cracking is disadvantageous since cracks formed in the blocks give an unsightly appearance to the finished blocks and floral arrangements. Moreover, these cracks are indications of structural weaknesses within the blocks.

It is known that when urea-formaldehyde foams are used for floral purposes as by inserting fresh cut flowers into water filled foam which acts as a support, it is desirable that the foam should not be overly acidic. Highly acidic foam tends to damage and cause premature wilting of flowers supported by the foam. It has been suggested that urea-formaldehyde resin be neutralized by immersion of the material in a liquid base such as sodium hydroxide or ammonium hydroxide. Normally, urea-formaldehyde foam may be immersed in a basic liquid solution after curing and substantially complete drying so as to raise the pH of the foam and make it suitable for use with fresh cut flowers. Often when a large volume of urea-formaldehyde foam is dipped or otherwise immersed in a liquid neutralizing agent, a substantial percentage of the foam cracks or disintegrates as previously described. Furthermore, liquid neutralization of foam is an extremely time consuming procedure.

Accordingly, it is an important object of this invention to provide a rapid and efficient method of treating acid catalyzed, aldehyde-condensation resin foams to prevent cracking and disintegration.

It is another important object of this invention to provide a method in accordance with the preceding object which is relatively inexpensive and can be used to treat large volumes of foam at one time.

According to the invention, acid catalyzed aldehyde-condensation foam is prepared by forming aldehyde-condensation foam into a self-supporting, partially cured, wet mass in accordance with known procedures. The wet mass is treated by exposing it to a basic gaseous substance for a period of time sufficient to prevent cracking of the foam upon final drying and complete curing of the foam. It is important that the foam be produced and treated by this method prior to final drying and complete curing of the foam since after conventional final drying and complete curing, stresses and strains are set up in the foam which tend to crack it. In a preferred form, acid catalyzed urea-formaldehyde foam having an open cell construction is formed and placed in suitable molds. After the foam has hardened to some degree, but before complete curing and drying, the foam is treated by placing it in an atmosphere comprising ammonia gas. After a suitable time, the ammonia gas atmosphere is removed and the foam so treated does not crack after subsequent processing steps and final drying.

Other features, objects and advantages of the invention will be better understood and appreciated from the following detailed description of one embodiment thereof selected for purposes of illustration and shown in the accompanying drawing, in which:

FIG. 1 is a semi-diagrammatic flow chart of a preferred embodiment of a means and method of making urea-formaldehyde foam employing the gas treatment step of this invention;

FIG. 2 is a view partially in cross section of a known extender;

FIG. 3 is a cross-sectional view through line 3—3 of FIG. 2;

FIG. 4 is a cross-sectional view through line 4—4 of FIG. 2;

FIG. 5 is a fragmentary cross-sectional view through a known mixing tube used in the process illustrated in FIG. 1; and, FIG. 6 is a top plan view of a mold for the foam produced.

With reference now to the drawing and particularly FIG. 1, a continuous system 10 for production of batches of urea-formaldehyde foam in accordance with this invention is diagrammatically shown. No claim is made to any invention that may reside in the apparatus or method of producing foam up to the point that the foam is extruded into a mold as a partially cured self-supporting mass.

In the process of producing foam, urea-formaldehyde resin, water and a wetting agent are added to a tank 11 and thoroughly mixed by a conventional mixer 12. The resin mixture is then pased through pipe 13, having a stop valve 14, into and through fluid pump 15. The resin mixture then is pumped through pipe 16 with simultaneous addition of air from air compressor 17 through air line 19 opening into pipe 16. The air-resin mixture continues along pipe 16 into an extender 20 which thoroughly mixes the resin with the air to form a foam. The foam is then forced through conduit 30 into a conduit 21 containing glass beads which create a predetermined back pressure in the system and from conduit 21 through a tubular blender or mixing tube 25 which has at a forward end thereof, a catalyst entrance port 23. The port 23 comprises a small diameter pipe with a pinched end 23A having a plurality of perforations at a lower end within the mixing tube 25. The tube 23 is provided with a stopcock 24 and a catalyst accumulator 22. Preferably the catalyst accumulator 22 is suitably attached to a liquid pump which forces a liquid catalyst at a predetermined rate, through holes provided at 23A. The catalyst is thoroughly blended with the foam as it passes through the mixing tube 25 which is provided with a plurality of baffles 27 (FIG. 5). The baffles 27 preferably comprise thin metallic plates arranged at various angles and extending across the passageway formed by mixing tube 25. The foam catalyst mixture is then passed out of an extrusion nozzle 26 which is preferably provided with a manifold having eight longitudinally aligned opening ports (not shown).

The foam coming out of the nozzle 26 is substantially self-supporting and has an appearance and texture similar to a wet mass of shaving cream. The foam is incompletely cured and is preferably placed in molds of the type shown in FIG. 6. The mold 31 shown in FIG. 6 comprises a small gauge, wire mesh basket 32 having a separate frame 33. The frame 33 is divided into 32 open top and bottom rectangular compartments with each compartment measuring approximately 9 by 4 and ½ inches and being 3 and ½ inches high. The frame 33 rests on the base of the basket 32 in use. It is sometimes desirable to place a cardboard or kraft paper sheet between the frame 33 and the bottom of the basket 32. When the foam mixture comes out of the nozzle 26, baskets of the type shown in FIG. 6 are passed under the nozzle as on a conveyor belt and each of the compartments substantially filled with the extruded foam.

The extender 20 may be any suitable apparatus for thoroughly mixing the liquid resin with the air to form a foam. A known extender of the type illustrated in FIGS. 2-4 is preferred. The extender 20 is an elongated cylindrical housing 34 having end plates 35 in which are positioned brass discs 41 and 40 maintained in spaced relationship by means of spacers 37, which may be formed of a plastic material such as polyvinyl chloride. The brass disc 41 has a number of perforations 45 around its outside perimeter while brass disc 40 has a number of perforations 47 near the center. The discs 41 and 40 are alternated to provide a tortuous path for the air-resin liquid mixture and with the spacers attached, are held firmly and tightly in place inside the cylindrical housing 34 by a rod 29 which runs through the center of the discs and is threaded at each end to a nut 38. The air-resin mixture is introduced and the foam removed through the annular openings of a foam outlet shown at 39. Preferably there are 8 holes or perforations in each disc, the diameter of which increases from the inlet to the outlet end. For foaming a 25-75% urea-formaldehyde suspension in water using an air pressure of between 50 and 200 pounds per square inch, the diameters of these perforations 45 and 47 are increased in twelve increments from 0.104 in. at the inlet end to 0.147 in. at the outlet end. Spacers 37 are likewise increased in thickness in four increments from 1/16 in. at the inlet end to ¼ in. at the outlet end. This arrangement allows for expansion within the foaming device.

According to known procedures, after foam is molded in the molds 31, it is left to dry and cure at room temperature for an extended period of time until final drying and curing is obtained. The exact time period will vary depending upon the volume of each molded object since larger objects will take longer periods of time to dry. Normally this time period is at least four days. However, complete drying and curing may be accomplished in much shorter times by the use of circulating and/or humidity controlled atmospheres as well as elevated temperatures. After complete curing and drying a substantial proportion of the foam produced by this known method has stresses and strains set up which cause the foam to crack or disintegrate. In some cases disintegration occurs when the foam is immersed in a liquid or in a high humidity atmosphere.

According to the invention, urea-formaldehyde or other aldehyde-condensation foam which has been acid catalyzed is exposed to a basic gaseous atmosphere before final drying and curing. When the foam blocks are molded in a system of the type described above, it is preferred to gas treat the foam blocks at some time between six and twenty-four hours after they are extruded from the nozzle 26 and placed in the mold 31. A preferred time period for blocks of this type is approximately sixteen hours. At this point, the foam is partially cured and is relatively stiff and hard. A more detailed description of this procedure will follow after a short description of a specific method of producing urea-formaldehyde foam employing the above described system of FIG. 1.

In a specific example of producing urea-formaldehyde foam according to known procedures employing a system as previously described with relation to FIG. 1, stop valve 14 is closed and 1150 pounds of "Urac 180" urea-formaldehyde resin and 110 gallons of water are added to the tank 11 and thoroughly mixed by mixer 12. The "Urac 180" urea-formaldehyde resin is a trademark product of American Cyanamid Company of Wayne, New Jersey and contains partially cured urea-formaldehyde resin in molar ratio of 1½-2 formaldehyde to 1 urea, a solids content of 66% and a viscosity of approximately 980 cps. as measured at standard room temperature on a Brookfield viscometer. The resin-water solution preferably may be adjusted by slight variations in the amount of water so that the final mixture has a viscosity of 19 cps. as read on a model RVF Brookfield viscometer (Synchro-Lectric Viscometer). Two and one-half gallons of "Arquad S-50" (a tradename product of Armour Industrial Chemical Company of Chicago, Illinois, containing alkyl-trimethyl ammonium chloride 50% and isopropanol 50% wherein the alkyl constituent is derived from soya oil fatty acids) are added to the tank 11 and stirred. The "Arquad S-50" acts as a wetting agent. Preferably the temperature of the mixture in the tank 11 is maintained between 90 and 95° F. although variations are possible. After 1 hour's time when thorough mixture of the ingredients in tank 11 is achieved, stop valve 14 is opened and the mixture passed through the fluid pump 15 which pumps the resin mixture under a fluid pressure of 120 pounds per square inch. Stop valve 18 is opened and air is admitted to the line 16 under pressure of approximately 140-150 pounds per square inch. The air-resin mixture is foamed in the blender 20 and passes through the glass bead tube 21. Stopcock 24 is opened and a 75% phosphoric acid aqueous solution is pumped through end 23 into the foam which is then passed through the mixing tube 25 which is preferably 60 inches long and approximately 2 inches in diameter. The wet foam is extruded through the nozzle 26 continuously and placed in molds 31.

Preferably the time period between opening valve 14 and completion of extrusion of foam from the nozzle 26 is approximately 2 and ½ hours. The phosphoric acid catalyst is metered into the system at a constant rate during the cycle with a total of approximately 45 pounds of the 75% solution of phosphoric acid employed. The wet urea-formaldehyde foam issuing from the nozzle 26 has a wet density of 3.6 grams per cubic centimeter and a pH of approximately 2.5. The dry weight of the foam after it has completed processing is approximately 1.75 pounds per cubic foot. The foam is substantially open interconnecting cell foam.

Turning now to a specific example of the present invention, a plurality of molds which have been filled with the foam as described above, are stacked and air dried as indicated at 50 in the drawings for a period of sixteen hours. Air drying is carried out by merely placing ten molds one on top of another in a stack and circulating air over the stacks at substantially room temperature. At the end of the sixteen hour period the molded urea-formaldehyde foam is found to be damp to the touch and not completely cured. The pH of the foam at this point is approximately 2.5. Following the diagram shown in FIG. 1, five stacks each containing 10 molds 31 are placed in a chamber open at the atmosphere. Ammonia gas is introduced into the chamber at a sufficient rate so that the ammonia concentration in the chamber reaches approximately 10% in one hour. Fans are positioned within the chamber to provide continuous gas circulation and thorough mixing of the ammonia gas with the atmosphere. It is preferred to keep the ammonia concentration no higher than 10% since higher mixtures tend to be explosive when ignited. After one hour's time, when the ammonia concentration has reached 10%, the chamber is evacuated, preferably by admitting air through one end of the chamber and exhausting the atmosphere in the chamber at a second end. After approximately eight hours, when the atmosphere within the chamber is substantially free of ammonia, the molds 31 are removed and the foam blocks have a pH of approximately 8.

When the blocks of foam produced are to be used as bases for cut flowers, the blocks are washed by running them through a water shower indicated at 52 in FIG. 1. Water is then allowed to drain from the blocks and they are placed in a dry atmosphere at room temperature and allowed to air dry. It is found that the pH of the foam blocks after the washing procedure normally is lowered to approximately 6.

While there has been described a specific example utilizing a basic gas procedure in accordance with this invention, many variations are possible and are within the scope of this invention. For example, basic gases other than ammonia may be employed to treat the foam so long as these gases do not react with the foam to cause unwanted breakdown in physical properties of the foam. The particular percentage of basic gas in the atmosphere surrounding the foam may be varied as desired and it should be understood that when lower concentration of basic gases are employed the period of exposure of the foam may necessarily be lengthened while when higher concentrations of basic gas are used the exposure period may be shortened. The exposure period of the foam to the gas may vary depending upon particular amounts and type of acid catalyst used to form the foam. In addition, the time period between formation of the wet foam and exposure to the basic gas may vary depending upon temperature conditions and relative proportion of acid catalyst to resin used. It is preferred that the gas be exposed to the foam for a period of time to substantially neutralize or at least raise the pH value of the foam to a pH of 5 and preferably no higher than 8. In some cases, depending upon the particular aldehyde-condensation resin foam being treated, larger variations in the pH value may be desirable below and above the range of 5-8.

The particular apparatus employed to expose the incompletely cured foam to the basic gas may also vary. For example, foam blocks or other shapes may be suspended over concentrated ammonium hydroxide. Rising ammonia fumes react with the acid catalyst present and neutralize the foam preventing cracking upon final drying.

The gas treatment process of this invention is useful to prevent cracking upon final drying of acid catalyzed aldehyde-condensation foams produced by many known methods other than the one specifically described. For example, in one known method an uncured resin is injected, with stirring into a reaction vessel containing an acidic liquid foam, prepared by whipping air into water contaning a surface active agent and an acid catalyst. The resin may be partially cured while distributed throughout the liquid foam. In procedures of this type it is important that the foam be formed into a wet soft spongy mass and then gas treated with a basic gas prior to complete hardening and curing of the foam. It is preferred that the gas treatment be employed with substantially open cell foam, however, prior art closed cell foam prepared by conventional prior art methods may be treated with a basic gas to inhibit cracking of the foam.

The aldehyde-condensation resin foams which may be treated in accordance with this invention are normally thermosetting resins formed by the condensation of formaldehyde or formaldehyde-producing components with such materials as phenol, urea, melamine, resorcinol or mixtures of one or more of these. The initial resin employed cannot be fully cured and is preferably soluble in water or at least dispersible in water. The solids content of the resin liquid may vary considerably in accordance with known practice and is a factor in determination of the final density of the foam produced. The density of the foam may vary considerably depending on the amount of air or other conventional foam producing gas incorporated in the foam.

The acid catalysts employed are preferably catalysts which are active to cure the foam at room temperature. Preferably strong mineral acids such as phosphoric, hydrochloric or sulfuric acids are used although other acids or acid producing catalysts may be used.

Other additives to the foam may be used in accordance with known practice including surface active agents such as wetting agents, fillers and in some cases pigments and dyes.

The urea-formaldehyde foam produced in accordance with this invention is useful as floral arrangement bases into which fresh cut flower stems may be inserted. The foam has sufficient strength to support the flowers while the pH of the foam is adjusted to prevent rapid wilting. However, the gas treated foams may be used for other conventional uses of aldehyde-condensation foams such as, insulation, ornamentation, ceiling panelling, etc.

It is evident that those skilled in the art may now make numerous modifications of and departures from the specific embodiments described herein without departing from the inventive concept. Consequently the breadth of this invention is to be construed as limited only by the spirit and scope of the appended claims.

What is claimed is:
1. A method for making a urea-formaldehyde foam substantially free from cracking upon drying in its final form, comprising the steps of
   (a) forming a urea-formaldehyde foam into a self-supporting wet mass containing an acid catalyst capable of curing said urea formaldehyde; and
   (b) while said foam is still wet, exposing it to gaseous ammonia thereby to neutralize at least a portion of any of said unreacted acid, said neutralization being carried out until the pH of said foam is raised to a value of at least 5.
2. A method in accordance with claim 1 wherein said acid catalyst is phosphoric acid.
3. A method in accordance with claim 1 wherein the pH of said foam is raised to a value above 7.
4. A method in accordance with claim 1 further characterized by including the step of washing the neutralized foam with water.

References Cited by the Examiner
UNITED STATES PATENTS

| | | | |
|---|---|---|---|
| 3,138,563 | 6/1964 | Morganet et al. | 260—2.5 |
| 3,189,479 | 6/1965 | Coppick et al. | 260—2.5 |

MURRAY TILLMAN, *Primary Examiner.*

M. FOELAK, *Assistant Examiner.*